(No Model.)
A. Y. SMITH.
INSECT TRAP.
No. 514,388.        Patented Feb. 6, 1894.
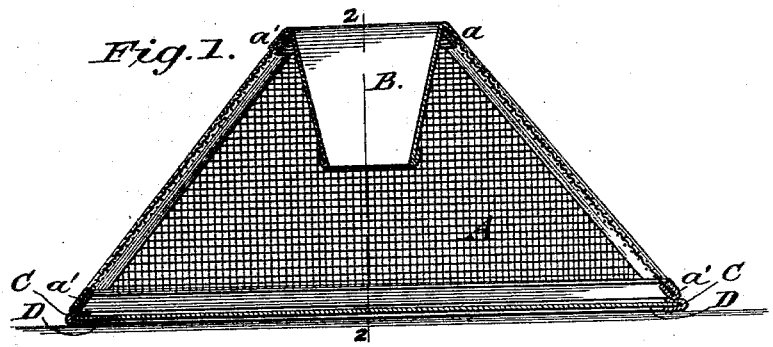
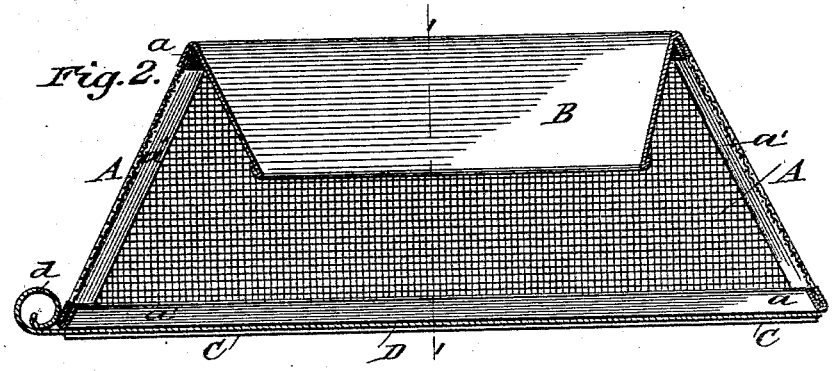
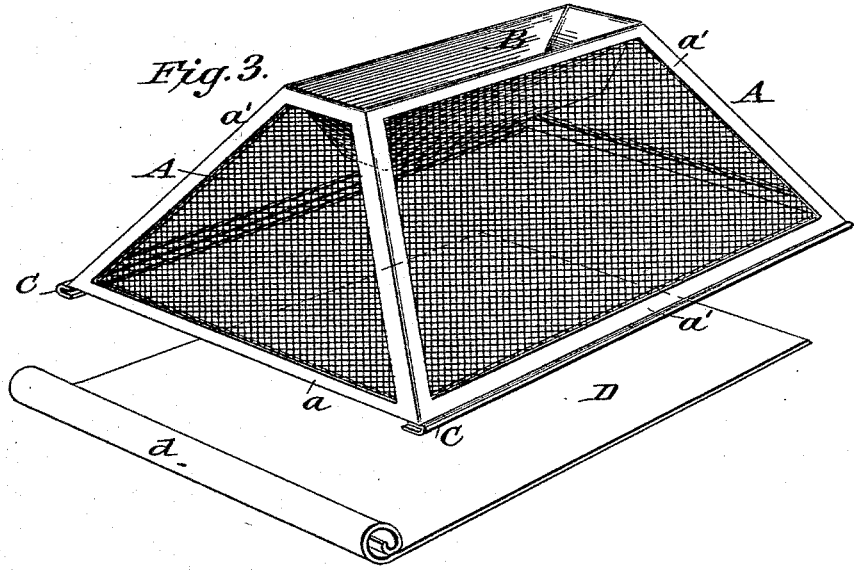
WITNESSES:
Fred G. Dieterich
M. D. Blondell
INVENTOR
Allen Y. Smith
BY
Munn & Co.
ATTORNEYS.
THE NATIONAL LITHOGRAPHING COMPANY,
WASHINGTON, D. C.

UNITED STATES PATENT OFFICE.

ALLEN Y. SMITH, OF EDDY, TERRITORY OF NEW MEXICO.

INSECT-TRAP.

SPECIFICATION forming part of Letters Patent No. 514,388, dated February 6, 1894.

Application filed May 10, 1893. Serial No. 473,673. (No model.)

*To all whom it may concern:*

Be it known that I, ALLEN Y. SMITH, of Eddy, in the county of Eddy, in the Territory of New Mexico, have invented a new and useful Improvement in Insect-Traps, of which the following is a specification.

This invention relates generally to insect traps and particularly to an improved trap designed for roaches.

The object of the invention is to provide a very cheap and simple construction of trap which will aid or facilitate the entrance of the insect but prevent its escape, and a further object is to so construct the trap, that by removing the bottoms a series of cases can be telescoped or packed into a very small space, an item of considerable importance in transportation and storage.

My invention consists in certain details of construction and novelties of combination all of which will be fully described and claimed.

In the drawings forming a part of this specification Figure 1 is a transverse vertical section of my improved trap. Fig. 2 is a longitudinal section and Fig. 3 is a perspective view with the bottom removed.

For the purpose of enabling others to make and use my invention I will now describe the various details of construction.

A indicates a case which is intended to hold the insects and is usually made pyramidal in shape as shown. The sides and ends are formed of a foraminous material such as wire gauze, secured to the end and bottom strips $a'$ of wood, metal, or other suitable material. These strips $a'$ are preferably made of tin for the sake of cheapness and simplicity, as each side and end can be made separate and then soldered together as shown, to provide a pyramidal case A.

The top of the case is left open and in said opening is arranged a funnel shaped entrance guide B, preferably of tin, said entrance guide projecting some distance into the case A and while its upper end is quite wide and open its lower end is so contracted that it will allow a roach to enter but prevent his escape, inasmuch as the mouth of the entrance is some distance below the top of case and the angles between the sides of case A and the sides of the guide B are such as to render locomotion of the insect almost impossible.

Guide ways C C are secured to the bottom of the sides of the case and sliding in said ways is a bottom D of tin or other material said bottom having its outer end doubled as shown at $d$ to provide a hand hold and also keep the sheet metal bottom perfectly flat, so that it will slide freely in the ways C C.

In operation some material attractive to the insect is dropped into the case, the bottom of course being first slid into the ways and pushed back to the opposite end of the case. The insect will then crawl up the sides and enter at the top and by making the sides sloping and of wire gauze the trapping is facilitated as the insect is enabled to see and smell the bait and the wire gauze is exceedingly easy to ascend. The entrance guide being smooth tin permits them to glide in very easily and the entrapment is accomplished.

When the trap is full the insects may be drowned or killed in any other manner, the bottom removed and the case cleaned and reset.

Having thus described my invention, what I claim as new, and desire to secure by Letters Patent, is—

1. In an insect trap the side and end frames, the smooth funnel shaped entrance at the top, the wire gauze covering secured to the side and end frames, the guide ways secured to the lower edges of the side frames, and a removable bottom sliding in said ways substantially as shown and described.

2. In an insect trap a pyramidal shaped case having an entrance at the top and side guide ways at the bottom and a removable bottom sliding in said ways and rolled at one end to provide a handle and stiffen the bottom substantially as described.

ALLEN Y. SMITH.

Witnesses:
WILLIAM J. TALLIAFERRO,
JOHN T. BOLTON.